G. P. VAN WYE.
STOPPER FOR VACUUM BOTTLES.
APPLICATION FILED JUNE 30, 1908.

918,246.

Patented Apr. 13, 1909.

WITNESSES:
C. H. Bertholf
Adele Juillerat

INVENTOR
George P. Van Wye.

UNITED STATES PATENT OFFICE.

GARRY P. VAN WYE, OF NEW YORK, N. Y.

STOPPER FOR VACUUM-BOTTLES.

No. 918,246.  Specification of Letters Patent.  Patented April 13, 1909.

Application filed June 30, 1908. Serial No. 441,212.

*To all whom it may concern:*

Be it known that I, GARRY P. VAN WYE, a citizen of the United States, residing at New York, in the county and State of New York, have invented a new and useful Stopper for Vacuum-Bottles, of which the following is a specification.

This invention relates to stoppers for bottles, and especially to stoppers for vacuum insulated bottles which are used to keep the contents hot or cold; and the object thereof is to provide a stopper which will not become impregnated with the contents of the bottle. In bottles of this kind it is customary to use them for many different beverages, as coffee, wine, milk, and unless the cork is changed for each beverage it soon becomes impregnated with the different beverages and becomes very offensive. Even where only one kind of beverage is used, the cork usually becomes so permeated with it as to be objectionable.

It is the purpose of this invention to provide a stopper so constructed as to prevent any of the contents entering the stopper, and, at the same time, not detract from the efficiency of the ordinary cork stopper as a heat insulator.

The invention is illustrated in the accompanying drawing, in which—

Figure 1:
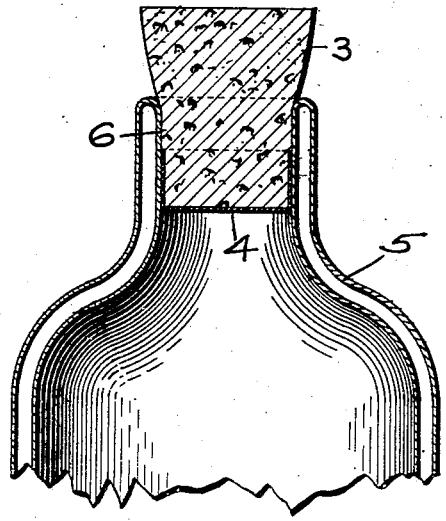
Figure 2:
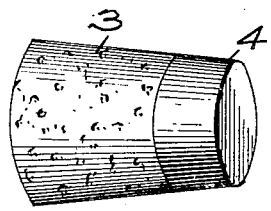

Figure 1, is a vertical section of a stopper constructed according to my invention, and a vertical section of a portion of a vacuum bottle with the stopper applied thereto, and Fig. 2, is a perspective view of the stopper.

In the drawing, like numerals of reference refer to the same parts in each of the views; and in practice I provide a stopper which may be composed of any suitable material, but preferably of cork for vacuum bottles owing to its non-heat conducting qualities; and in order to render this cork impervious to the contents of the bottle, I have provided a ferrule of very thin material, preferably of aluminum, which I mount on the small end thereof. The cork, or body portion I indicate by 3, and the ferrule by 4, and the vacuum bottle to which it is applied is indicated by 5. As shown in Fig. 1, the vacuum chamber extends up the neck of the bottle to the lip, and the ferrule 4, does not extend up the body portion of the cork far enough to be exposed at the mouth of the vessel, thereby allowing for a portion of the cork 6, to engage the neck of the bottle below the top of the vacuum chamber, and effectually shutting off the conduction of heat from the bottle by the ferrule. By this construction I am able to protect the stopper from being impregnated with the contents of the bottle, and, at the same time, no heat will be lost through the metal ferrule. I have thus been able to overcome a serious objection to the cork stopper, and have provided means to prevent the absorption by the cork of any ingredient, or beverage ordinarily used in these bottles whether hot or cold.

In applying the ferrules, they should be stamped up out of very thin sheet metal; and may be secured to the cork in any desired manner.

Having thus described my invention, what I claim as new and desire to secure by Letters Patent of the United States is:

1. The combination with a vacuum bottle having a vacuum insulated neck of a stopper comprising a tapered body portion of cork, and a ferrule of non-absorbent material, on the small end thereof, a portion of the cork above said ferrule being in engagement with the said vacuum insulated neck, as and for the purpose set forth.

2. The combination with a vacuum bottle having a vacuum insulated neck of a stopper comprising a body portion of low heat conductivity, and a liquid contact portion of non-absorbent material, said low heat conduction material being in contact with the said vacuum insulated neck above said non-absorbent material, for the purpose set forth.

In testimony whereof I have signed my name to this specification in the presence of two subscribing witnesses.

GARRY P. VAN WYE.

Witnesses:
 ADELE V. JUILLERAT,
 C. H. BERTHOLF.